United States Patent
Blue et al.

(10) Patent No.: US 7,506,025 B1
(45) Date of Patent: Mar. 17, 2009

(54) USING A PROXY TO REDIRECT DOWNLOADS

(75) Inventors: George M. Blue, Southampton (GB); Philip G. Willoughby, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/056,926

(22) Filed: Mar. 27, 2008

(51) Int. Cl.
*G06F 15/16* (2006.01)
*G06F 12/00* (2006.01)

(52) U.S. Cl. ..................................... 709/203; 709/232

(58) Field of Classification Search ................ 709/203, 709/217, 218, 232, 250
See application file for complete search history.

(56) References Cited

U.S. PATENT DOCUMENTS

| | | | |
|---|---|---|---|
| 6,023,724 A * | 2/2000 | Bhatia et al. ................. | 709/218 |
| 6,505,236 B1 | 1/2003 | Pollack | |
| 7,137,040 B2 * | 11/2006 | Bae et al. ..................... | 714/47 |
| 7,200,644 B1 | 4/2007 | Flanagan | |
| 2002/0120945 A1 * | 8/2002 | Schwalb ...................... | 725/140 |
| 2004/0098592 A1 | 5/2004 | Taki | |
| 2006/0143432 A1 * | 6/2006 | Rothman et al. ............... | 713/2 |
| 2007/0198674 A1 | 8/2007 | Li et al. | |

OTHER PUBLICATIONS

File eXchange Protocol, http://en.wikipedia.org/wiki/File_eXchange_Protocol.

* cited by examiner

*Primary Examiner*—Zarni Maung
(74) *Attorney, Agent, or Firm*—Oppenheimer Wolff & Donnelly LLP

(57) ABSTRACT

The present invention provides for a method of using a proxy to redirect downloads from a web server to one or more remote machines via a command issued from a local computer web browser. A user accesses the web server with a web browser on a local computer, and uses the web browser to initiate the download from the web server. Connection and authentication information for the download is sent to a router/proxy which is connected to both the local machine and the one or more remote machines. The router/proxy redirects the download to a process running on the one or more remote machines, where the download then saved. The web browser on the local computer then is notified when the download is complete.

1 Claim, 2 Drawing Sheets

USING A PROXY TO REDIRECT DOWNLOADS

FIELD OF THE INVENTION

The present invention generally relates to computer systems transferring data over a network. The present invention specifically relates to a method of using a proxy to redirect downloads among multiple computer systems connected to a network.

BACKGROUND OF THE INVENTION

A common problem for system administrators is the process required to install software or software updates onto one or more remote machines, commonly remote servers. Often, the only source of the software is an internet website which requires a user to accept a license agreement before the download can proceed. The user must navigate to the website in a browser, provide authentication, and/or accept terms and conditions before downloading. Thus, it is often not possible to download software from a source web server unless each step is followed within a web browser.

To facilitate the download of internet-hosted software from a source web server to a remote machine, there are known workarounds. One method is to have the administrator download the data to a local computer, and then upload it to the remote machine(s). A large problem with this method is that the local desktop may have a poor networking connection compared with the remote machine. For instance, the system administrator may be working at home on a slow internet connection, and unable to quickly download or upload files. Additionally, the uploading step has to be repeated when the software is placed on each remote machine. One workaround commonly used is saving the file to a shared network drive that is accessible by the remote machine. However, this does not solve the problem of network bandwidth, and still requires the local computer to download the file first.

Another method to place the software on the remote machine is to browse to the website from a web browser running on the remote machine(s). However, this is often not technically possible—for example, the website may require the use of a complete web browser to download the files (as opposed to using a command such as "wget"), and the way that many servers are configured means that they do not have web-browsers installed. Additionally, entering authentication information (such as passwords) on a remote machine may have implications for computer security, and it is impractical to initiate a remote session on the server for an often-trivial task.

What is needed in the art is a way to directly transfer files over the internet from a source web server onto a remote target machine through a file transfer being initiated on a local computer.

BRIEF SUMMARY OF THE INVENTION

The present invention provides a new and unique method for using a proxy to redirect downloads from a website to a remote computer. In one embodiment of the present invention, this method operates by having a user use a local computer to access the website containing the file(s) to be downloaded. The user's local computer is connected on a network to a router, and establishes an internet connection to the website through the router. The user's access to the website includes taking the necessary steps to obtain access to the website, such as accepting a licensing agreement, entering a username and password, or providing other necessary authentication information.

Next, the user initiates a download request from the browser running on the local computer to download one or more selected files. When the user is presented with a choice of where to save the file, the user selects an option to save the file to a remote computer, such as a remote server. This remote computer is also connected to the internet through the router.

Before the local computer begins downloading the selected files, the connection information necessary to download the file from the website is communicated from the web browser on the local computer to the router. This allows the router to take the place of the web browser and intercept the data that is intended for the web browser download.

After the data download is initiated by the user in the browser, the download begins onto the remote server specified as a target for the files. This occurs by having the router redirect the data that was directed to arrive at the local computer browser onto the remote computer. At the same time, a process is operating on the remote computer to listen for redirected data. This process running on the remote computer collects the data and saves it into a predetermined location.

Finally, the web browser on the user's local machine is notified when the data download onto the remote computer is complete. The user will receive notification in the browser if the file was successfully or unsuccessfully saved, appearing as if the file transferred to the local computer.

DETAILED DESCRIPTION OF THE INVENTION

One aspect of the present invention involves the use of a modified browser to initiate the download of a file from a website. The transfer of data from the website is redirected to a process operating on remote computer through the use of a proxy such as a modified router. One embodiment of the present invention allows files to be redirected and transferred over the internet through HTTP without the use of specialized or modified file transfer protocols. Further embodiments of the present invention may be extended to allow operation via the HTTPS protocol and potentially any other protocol that can be used to download files.

Figure 1:
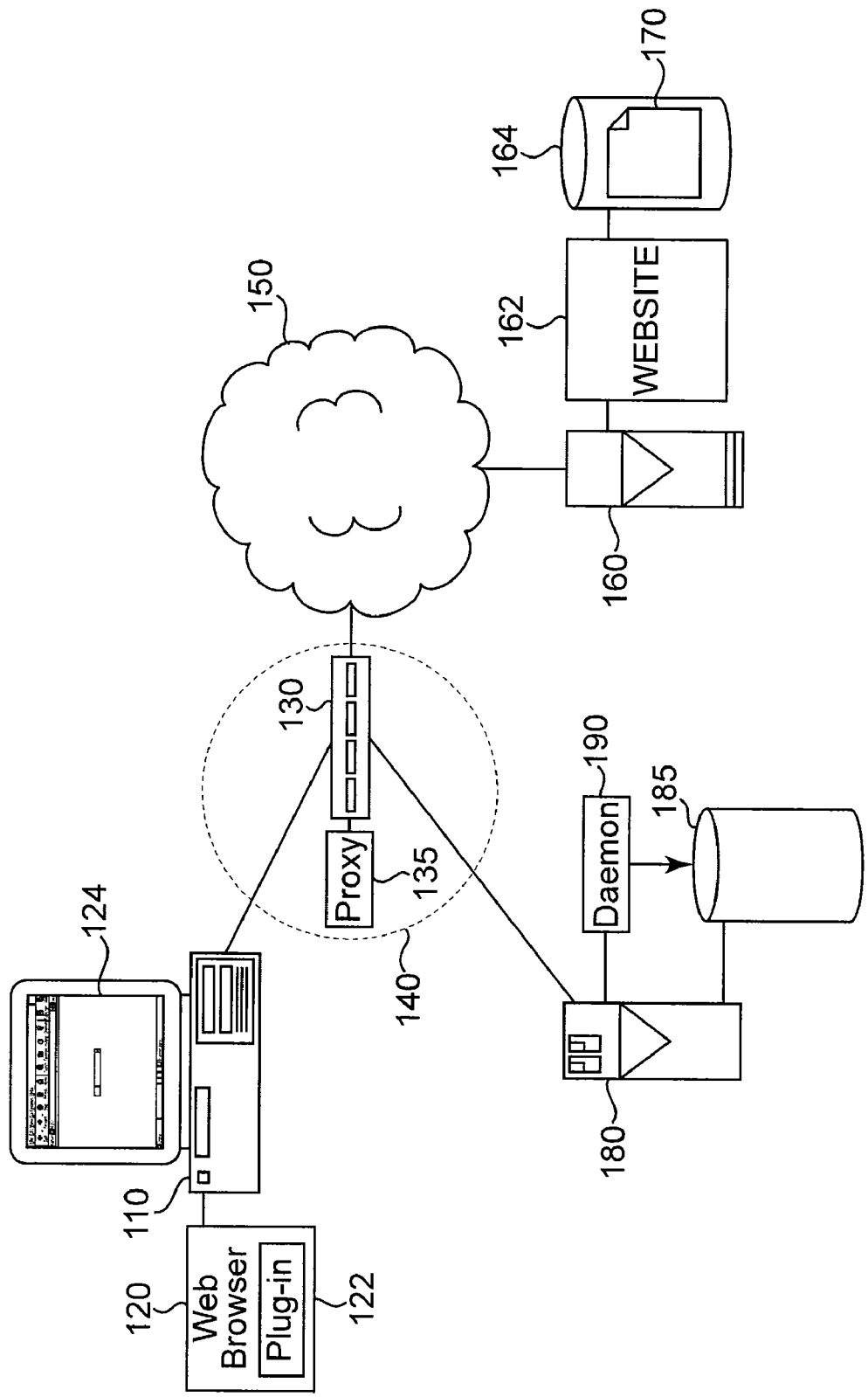
FIG. 1 illustrates an exemplary operational environment for one embodiment of the present invention.

FIG. 1 depicts an example implementation environment of the present invention. In one embodiment of the present invention, the components utilized for this invention include (a) a browser 120 modified to contain functionality to save a file on a remote server 180, this modification implemented through a browser plug-in 122; (b) a router or gateway 130 modified to include a proxy process 135; and (c) a daemon or equivalent process 190 running on the target server machine 180.

As depicted, the user, commonly a system administrator, will navigate to the website via the graphical interface 124 of a browser 120 operating on local computer 110. The local computer 110 is connected via a network 140 to a router 130 and further connected to the internet 150. The target server machine is similarly connected via the network 140 to the router 130. This configuration would work similarly the network was configured to include a cluster of routers instead of a single router 130.

When a user uses the browser 120 to download a file 170 stored on a volume 164 accessible via a website 162, the user will be asked by the browser 120 where to save the file. One of the choices presented within the modified browser 120 will include a volume 185 on the remote server machine(s) 180. If the user chooses one (or more) of a remote location, the browser will inform the proxy process 135 operating on the organization's router 130 and the target server(s) 180 of the decision.

The router 130 will then send data which represents the file being downloaded 170 to the server machine(s) 180 rather than the browser 120 running on the local computer 110. The server machine(s) 180 will then store the file data on a data volume 185 using the daemon process 190. Once the server machine(s) 180 receives all of the data, the browser 120 operating on the user's machine 110 will be notified that the download is complete, allowing the user to use the downloaded software.

Figure 2:
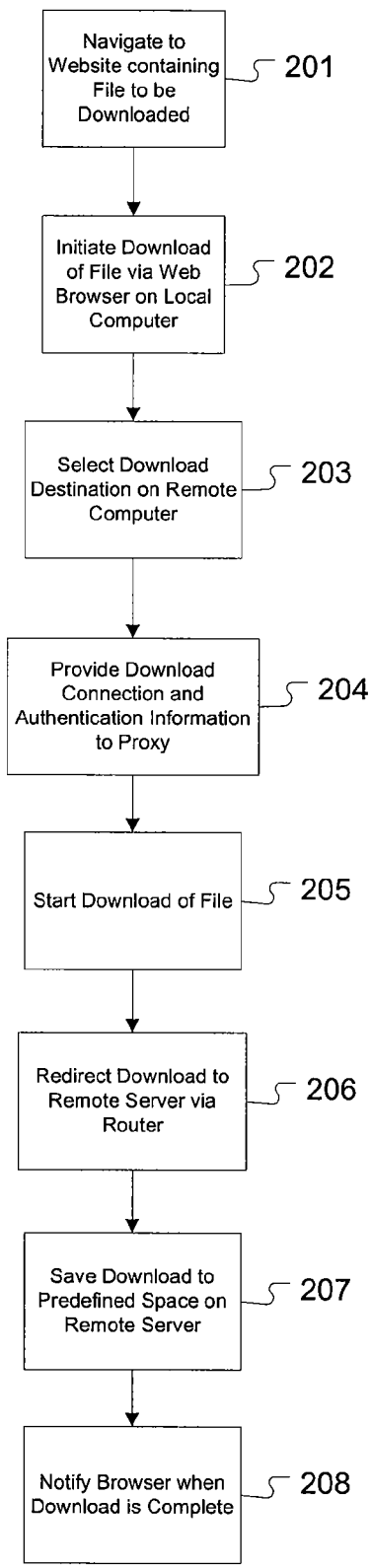
FIG. 2 illustrates an exemplary operation of the method for using a proxy to redirect downloads in accordance with one embodiment of the present invention.

FIG. 2 depicts a workflow utilized for redirecting downloads via a proxy. The steps used by the method according to a further embodiment of the invention are as follows:

1. Step 201: The user navigates to a website with a local computer, accepting any license agreements and authenticating access to the website as required.

2. Step 202: The user instructs the browser to start a download of a selected file.

3. Step 203: As happens with typical web browsers, the browser asks the user where he or she would like to save the file. The browser not only provides an option to save the file to the local machine, but the browser contains modified functionality to provide the user with the option to save the file to a remote machine, typically a server. This modified browser functionality may be implemented through a plug-in for commonly used web browsers.

4. Step 204: If the user chooses to download the file to a remote server(s), then the browser will communicate with the router and the server(s), and the router and the remote server will also communicate with each other. The communications will include:

Sufficient information for the server (or the router) to pretend to be the browser. This may include information such as the socket state, cryptographic session keys, information from cookies, or other relevant authentication information.

Information about the file(s) being downloaded, such as the name(s).

5. Step 205: The modified browser on the local computer will start the download from the website.

6. Step 206: The router will route all information regarding the download to the remote server(s). This step requires that the router contain modified logic, most likely in the form of some software operating on the router, to enable the transfer of data to the remote server. The router will utilize the information described above to pretend to be the browser, allowing it to control the connection and redirect traffic from the website to the remote server.

7. Step 207: The process operating on the remote server(s) will receive the file(s) and save the file(s) to a predefined space, which may be a temporary folder. This process is implemented as a small piece of software running on a server, such as a daemon(s) process or service running in the background.

8. Step 208: The remote server(s) will notify the browser on the local computer once the download(s) is complete. Upon completion of this method, the downloaded software exists on the desired remote servers without having passed through the client's browser at all.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for using a proxy to redirect downloads from a website to a remote computer through use of a local computer, comprising:

accessing a website with a web browser operating on a local computer, the local computer connected over a network to the website through a router;

initiating a download request from the local computer to the website to download data;

instructing the web browser to save the data download on one or more selected remote computers, the one or more selected remote computers connected over the network to the local computer through the router;

communicating connection information of the download request from the web browser to the router, wherein the connection information contains information necessary for the router to intercept the data download from the website to the local computer;

initiating the data download from the website within the web browser;

redirecting the data download directed to arrive at the web browser operating on the local computer including intercepting the data download and forwarding the data download to the remote computer;

operating a process on the remote computer to save the data download to a predetermined location; and notifying the web browser of completion of the data download onto the remote computer.

\* \* \* \* \*